United States Patent [19]
Cassidy

[11] Patent Number: 5,488,533
[45] Date of Patent: Jan. 30, 1996

[54] METHODS AND APPARATUS FOR ISOLATING A POWER NETWORK FROM A LOAD DURING AN OVERCURRENT CONDITION

[75] Inventor: Bruce M. Cassidy, Boca Raton, Fla.

[73] Assignee: International Business Machines Corporation, Armonk, N.Y.

[21] Appl. No.: 192,921

[22] Filed: Feb. 7, 1994

[51] Int. Cl.⁶ .................................................. H02H 3/20
[52] U.S. Cl. ............................ 361/18; 361/87; 361/91
[58] Field of Search ............................. 361/18, 89, 86, 361/91, 87

[56] References Cited

U.S. PATENT DOCUMENTS 5,018,041  5/1991  Szepesi ........................................ 361/18
5,159,516  10/1992  Fujihira ...................................... 361/18

*Primary Examiner*—Todd DeBoer
*Attorney, Agent, or Firm*—Arthur J. Samodovitz

[57] ABSTRACT

A branch protection circuit is provided to isolate a power network from a faulty load such as an overcurrent condition. The circuit employs a current-sense field effect transistor formed from two power field effect transistors integrated onto the same silicon substrate. The current-sense-FET is provided to detect if the electrical current in the larger FET has exceeded a predetermined threshold level. The circuit does not measure the specific current flowing through the transistors, and the circuitry employed to detect if the threshold current level is exceeded is significantly less complex than circuitry otherwise required to determine a specific current flow through one of the transistors.

9 Claims, 2 Drawing Sheets

5,488,533

1

METHODS AND APPARATUS FOR ISOLATING A POWER NETWORK FROM A LOAD DURING AN OVERCURRENT CONDITION

BACKGROUND OF THE INVENTION

The present invention is directed to branch protection circuitry provided to isolate a power network from a faulted load such as an overcurrent condition. The capability of isolating a power network from a faulted load is of significant importance, particularly in distributed power architectures. For certain applications, isolation of a power network from a faulted load is accomplished by fuses. Fuses are used in applications where low reliability is acceptable. In other applications, particularly where high power dissipation will occur, isolation of a power network from a faulted load is accomplished by placing a resistor in series with the power device.

It is the primary object of the present invention to provide a branch protection circuit having small dissipation and high reliability, which will latch off as long as a faulted load is present and will turn on after the fault has been removed. Conventional circuitry providing branch protection includes relatively complicated circuit means for measuring electric current flowing through a transistor. The branch protection circuit in accordance with the present invention is designed to sense only when electrical current flowing through a transistor exceeds a predetermined threshold value, but will not otherwise measure the specific value of the current flow. Accordingly, less expensive and less complicated circuitry is employed in the branch protection circuit in accordance with the present invention.

Typical prior art devices are exemplified by: Sears U.S. Pat. No. 4,202,023, issued on May 6, 1980 disclosing a circuit overload protector; Ganesan et al, U.S. Pat. No. 4,573,099 issued on Feb. 25, 1986 disclosing a CMOS circuit for providing overvoltage protection between a positive supply voltage rail and a negative supply voltage rail; Damiano et al U.S. Pat. No. 4,626,954 issued on Dec. 2, 1986 disclosing a solid state power controller with overload protection; Hechtman et al U.S. Pat. No. 4,795,920 issued on Jan. 3, 1989 disclosing a driver circuit for alternately sourcing current to, and sinking current from, a load and alternatively for presenting a high impedance thereto; Nadd U.S. Pat. No. 4,994,886, issued on Feb. 19, 1991 disclosing a composite MOS transistor and application thereof to a free-wheel diode structure; Wilcox U.S. Pat. No. 5,017,816, issued on May 21, 1991 for an adaptive gate discharge circuit for discharging the gate of a power FET transistor; Szetesi U.S. Pat. No. 5,018,041, issued on May 21, 1991 disclosing a current limiting circuit for instantaneously limiting the peak current of a fast high side power switch or power FET; Wodarczyk et al U.S. Pat. No. 5,023,692, issued on Jun. 11, 1991 disclosing a power MOS transistor having a current limiting circuit incorporated into the same substrate as the transistor; Hirota et al U.S. Pat. No. 5,027,251, issued on Jun. 25, 1991 disclosing a MOSFET device including a power MOSFET and a current mirror MOSFET which have drains coupled to each other; Elliott et al U.S. Pat. No. 5,029,269, issued on Jul. 2, 1991 to disclosing a delayed power supply overvoltage shut down apparatus for protecting a pulse-width modulated DC-DC power supply; Lee U.S. Pat. No. 5,088,018, issued on Feb. 11, 1992 disclosing an overvoltage protection power supply circuit for preventing an overvoltage from being applied directly to a flat panel display element; and Nakayama U.S. Pat. No.

2

5,105,251, issued on Apr. 14, 1992 disclosing a semiconductor device comprising first and second power MOS transistors which are formed on the same semiconductor chip in a common drain.

The branch protection circuit in accordance with the present invention disclosed herein provides simplified means for isolating a power network from a faulted load not taught or suggested by the aforementioned prior art. The circuit in accordance with the present invention is less complicated and economical than the conventional circuitry and devices disclosed by the above referenced prior art. Other advantages will become apparent from the following description.

SUMMARY OF THE INVENTION

Branch protection circuitry is provided for isolating a power network from a faulted load caused by an overcurrent condition. The circuit includes means for detecting a faulted load and latching off during the time that the faulted load is present and enabling the circuit to be turned on again upon removal of the fault. The branch protection circuitry employs a current-sense-FET formed from two power FETs integrated onto a common silicon substrate and sharing a common gate and drain. The current-sense-FET provides means for detecting when the current in the larger FET exceeds a predetermined threshold value corresponding to the presence of a faulted load. The circuitry includes means for detecting a scaled down current corresponding to a current overload applied to the load, and means responsive thereto for driving the current-sense-FET into an "off" state to isolate the load from the network until the overcurrent condition is removed. The circuitry does not determine or measure specific current flow but only detects if a predetermined current level has been exceeded, and thus requires less complex components and circuitry than would otherwise be required. The branch protection circuitry in accordance with the present invention exhibits relatively small power dissipation and thus provides high reliability.

BEST MODES FOR CARRYING OUT THE INVENTION

Figure 1:
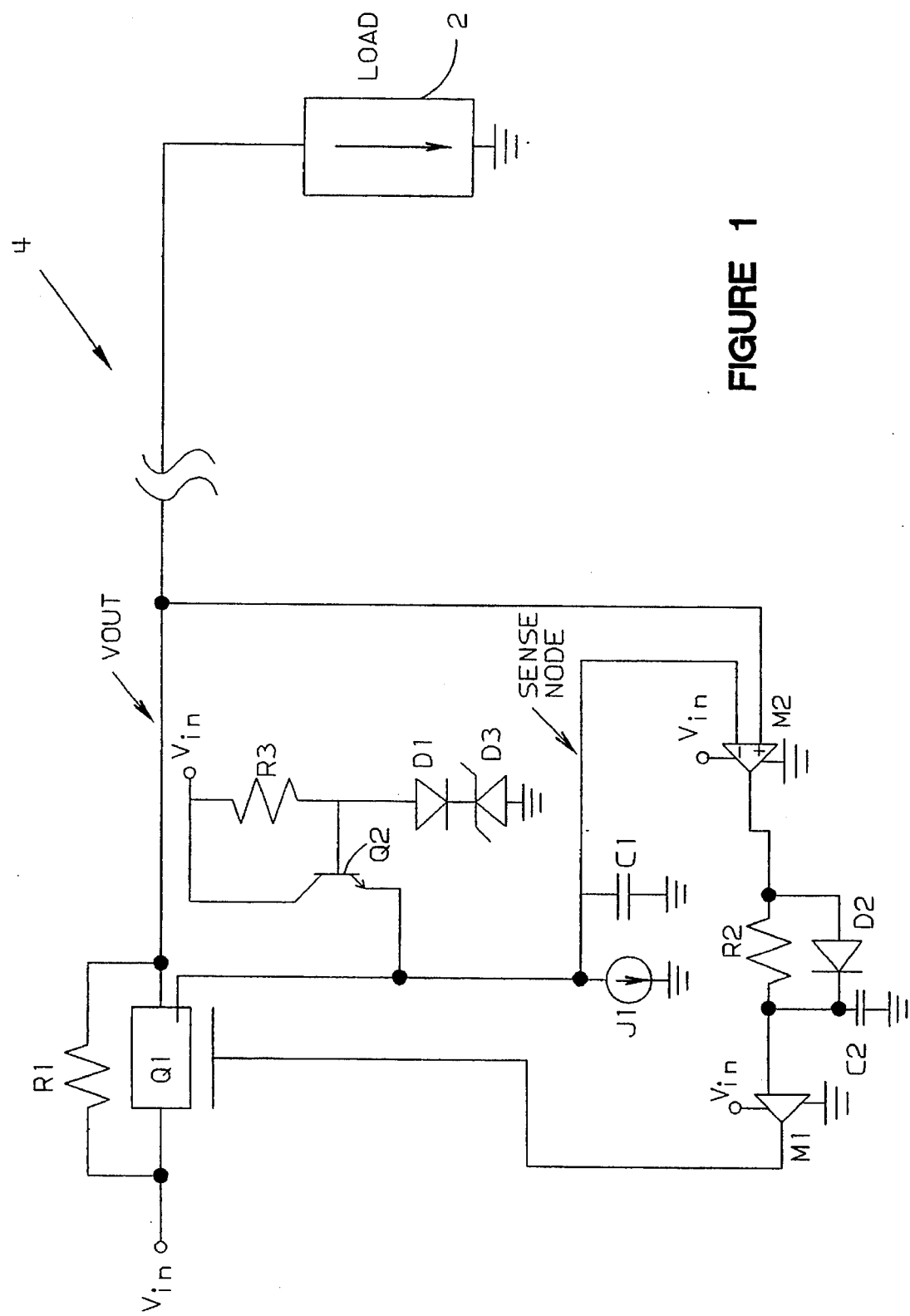
FIG. 1 of the drawing illustrates a branch protection circuit for isolating a power network from a faulted load in accordance with the present invention.

The preferred embodiment of the branch protection circuitry in accordance with the present invention will now be discussed with reference to FIGS. 1 and 2 of the drawing. The preferred embodiment of the branch protection circuit provides circuit means for isolating a power network from a faulted load such as an overcurrent condition, particularly in distributed power architectures. The circuit in accordance with the preferred embodiment of the invention will latch off as long as a faulted load is present and will latch on as long as the fault has been removed. The circuit is characterized by small power dissipation and high reliability. The branch protection circuit includes a current-sense-FET formed from two power FETs which are integrated onto the same piece of silicon. The two power FETs share a common gate and drain, and one power FET is significantly larger (in the order of magnitude of about 5,000 times larger) than the other power FET. However, instead of using the FET devices with other circuitry as a means for conventionally measuring the electrical current flowing through the larger of the two power FETs, the current-sense-FET device in accordance with the present invention is provided only to detect if the current flowing through the larger power FET has exceeded a predetermined threshold current level. In this manner, the simpler determination enables use of circuitry of a significantly less complex nature than that employed to measure actual current flow, particularly when the FET is referenced to a plus rail.

Referring first to FIG. 1 of the drawing, it is initially assumed that the load, designated by reference numeral 2, is electronically controlled so that it looks capacitive until a predetermined voltage (Vth) is reached. The branch protection circuit in accordance with the present invention, which is generally designated by reference numeral 4, is electrically coupled to the load 2. When power is applied to the circuit 4, $V_{out}$ is charged through a resistor R1 until $V_{out}=$ VD3<Vth. (VD3 is the breakdown voltage of zener diode D3.) A clamp formed from resistor R3, transistor Q2, and diodes D1 and D3, which is electrically coupled to current-sense-FET Q1, holds the sense node higher than $V_{out}$. Accordingly, the current-sense-FET Q1 is in its "off" state. However, when $V_{out}$<VD3, the output of a comparator M2 goes high and turns on a driver M1 which is electrically coupled to Q1. The driver M1 turns on current-sense-FET Q1, and allows $V_{out}$ and the sense node to go to approximatly $V_{in}$. The driver M1 includes a charge pump to allow the gate of FET Q1 to be driven to about 10 volts>$V_{in}$.

Figure 2:
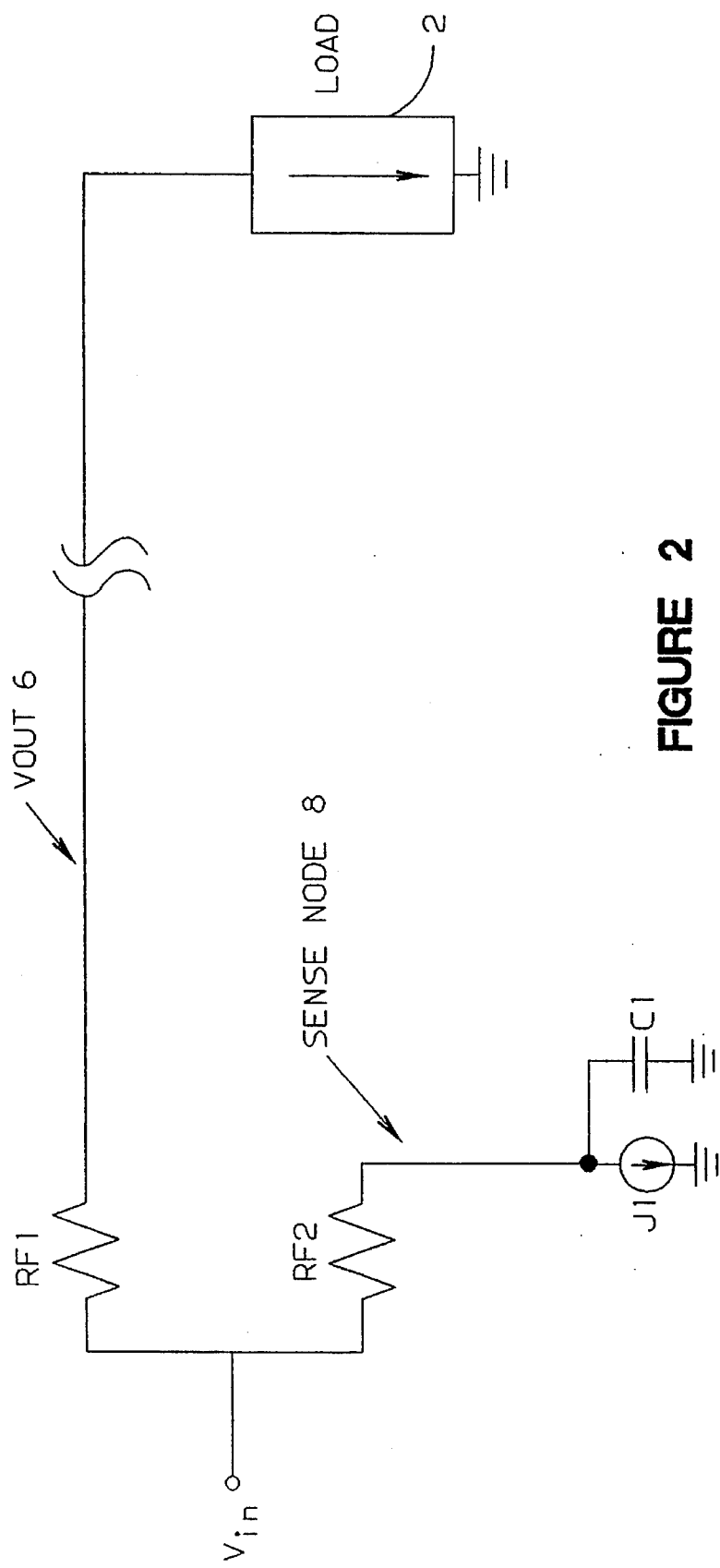
FIG. 2 of the drawing illustrates the equivalent circuit of the current-sense-FET of FIG. 1, together with other circuit components, in accordance with the branch protection circuit of the present invention.

FIG. 2 of the drawing illustrates an equivalent circuit of current-sense-FET Q1 when the transistor Q1 is on, together with the components J1 and C1. In accordance with the present invention, $V_{out}$ designated by reference numeral 6, will be > the sense voltage at the sense node designated by reference numeral 8, provided that the load current multiplied by RF1 is less than J1 multiplied by RF2. However, when the load current increases to a value at which $V_{out}$ falls below the sense voltage, the comparator M2 (having its output coupled to the input of driver M1) changes state, causing the driver M1 (see FIG. 1) to change state to turn off the current-sense-FET Q1. The current detector J1 is formed from active circuits in a conventional manner. Capacitor C1 is electrically coupled to the input of J1 to prevent the sense voltage at the sense node 8 from rising faster than the output voltage $V_{out}$ (as designated by reference numeral 6) when the current-sense-FET Q1 is initially turned on.

Accordingly, when an overcurrent condition is reached and it is necessary to isolate the power network from the load 2, the comparator M2 changes states and turns off the driver M1 which will turn off the current-sense-FET Q1. $V_{out}$ will go to approximately zero volts, but the sense voltage at the sense node 8 will maintain a voltage value equal to VD3 as a result of the clamp arrangement formed by Q2, R3, and D1 and D3. The clamp is electrically coupled to current-sense-FET Q1, and thus Q1 will stay in its "off" condition until the fault (i.e., overcurrent condition) is removed. Resistor R2, diode D2, and capacitor C2 (See FIG. 1) are provided in the branch protection circuit and electrically coupled between the comparator M2 and the driver M1 for the FET Q1, in order to prevent very short duration overcurrents from tripping the circuit. Accordingly, momentary surges in the line current will not result in a fault or overcurrent condition and will not cause the current-sense-FET Q1 to be turned off by the driver M1 which is electrically coupled thereto.

It is apparent from the above description of the branch protection circuit, that J1 provides the scaled overcurrent detect value. For example, referring to FIG. 2, if RF2=5,000×RF1 (i.e., the two power FETs forming the current-sense-FET Q1 include one power FET 5,000 times larger than the other FET), for overcurrent protection of 5 amps, J1 would be required to be set to 1 milliamp. When the current flow through J1 reaches the 1 milliamp value, the current flow into the load will be 5 amps (5,000×1 milliamp), resulting in an overcurrent condition. Thus, a flow of 5 amps through the branch protection circuit 4 and into the load 2 results in a flow of 1 milliamp through the detector J1, as a result of the 5,000/1 ratio between the size of the two power FETs which are integrated onto the same piece of silicon and share a common gate and common drain which form the current-sense-FET Q1. Detection of current flow of 1 milliamp or greater by J1 actuates the comparator M2 which in turn actuates the driver M1 to turn off the FET Q1 as a result of the fault (overcurrent condition). When the fault is removed, the other loads will be turned off because of the low input voltage. Therefore, $V_{out}$ will once again be charged by R1 until $V_{out}$ reaches a voltage equal to VD3. At that point Q1 is turned on again and $V_{out}$ is charged to $V_{in}$.

It is apparent from the above discussion that the circuitry in accordance with the present invention will automatically isolate a load from a power network when the current applied to the load exceeds a predetermined overcurrent limit. Similarly, the load will be restored to the network when the applied current drops below the overcurrent limit. The circuitry is designed to detect when current applied to the load is above or below a predetermined current limit (as detected by a scaled-down current corresponding to a predetermined fraction of the electrical current flowing into the load), but not measuring the actual value of current applied to the load or the actual value of the scaled-down current flow. Accordingly, the overall circuit is simpler in operation, requires less complicated components, and is more economical to fabricate than conventional circuitry which measures actual current flow.

Other modifications and advantages within the scope of the invention will become apparent to those skilled in the art. Accordingly, the above description of the preferred embodiments illustrated by the drawings is intended to be illustrative only, and not restrictive of the scope of the invention, that scope being defined by the following claims and all equivalents thereto.

I claim:

1. An electrical circuit for controlling current from a power source to a load, said circuit comprising:

transistor means, having a load current path coupled between the power source and the load, for supplying load current, and having a sense current path coupled to said power supply, for supplying sense current proportional to but substantially less than said load current, and wherein a load voltage decreases as the load current increases due to increasing voltage drop across said load current path;

bias means for preventing an output of said sense current path from falling below a predetermined voltage;

a current sink coupled to said sense current path output; and a comparator having a first input coupled to said sense current path output, a second input coupled to said load and an output coupled to activate said transistor means when said load voltage is greater than a voltage of said sense current path output and deactivate said transistor means when said load voltage is less than the voltage of said sense current path output.

2. A system as set forth in claim 1 wherein the bias means comprises:

a transistor having an output coupled to said sense current path output; and diode means, coupled to receive bias current from said power supply and coupled to a control of said transistor, to bias said transistor to output said predetermined voltage.

3. A circuit as set forth in claim 1 wherein said transistor means comprises two FETs, one of said FETs comprising a low resistance drain to source path which forms said load current path and the other FET comprising a substantially higher resistance drain to source path which forms said sense current path.

4. A circuit as set forth in claim 3 wherein both of said FETs are integrated into a common substrate and have a common drain or common source.

5. A circuit as set forth in claim 1 further comprising a shunt resistor connected across said load current path of said transistor means to supply a load current when said transistor means is deactivated, said resistor being greater than an on-resistance of said load current path.

6. A circuit as set forth in claim 1 wherein said sense current path output is connected to said first input of said comparator.

7. A circuit as set forth in claim 6 wherein said current sink is connected to said sense current path output.

8. A circuit as set forth in claim 7 wherein said load is connected to said second input of said comparator.

9. A circuit as set forth in claim 1 further comprising a driver interposed between said comparator output and a control of said transistor means.

\* \* \* \* \*